United States Patent [19]

Macpherson

[11] 4,219,142
[45] Aug. 26, 1980

[54] BICYCLE RACK FOR AUTOS

[76] Inventor: Roger Macpherson, 185 Pleasant Way, Penfield, N.Y. 14526

[21] Appl. No.: 33,813

[22] Filed: Apr. 27, 1979

[51] Int. Cl.³ .......................... B60R 9/04; B60R 9/08; A47F 7/00

[52] U.S. Cl. .............................. 224/324; 224/42.03 B; 211/22

[58] Field of Search ................. 224/309, 324, 42.03 R, 224/42.03 B; 280/289 A; 211/17, 22

[56] References Cited

U.S. PATENT DOCUMENTS

| | | | |
|---|---|---|---|
| 3,260,429 | 7/1966 | Yuda et al. ........................... | 224/324 |
| 3,921,869 | 11/1975 | Rogers ........................... | 224/42.03 B |
| 3,931,919 | 1/1976 | Gerber et al. ........................... | 224/324 |
| 4,171,077 | 10/1979 | Richard, Jr. ................... | 224/42.03 B |

*Primary Examiner*—Steven M. Pollard
*Attorney, Agent, or Firm*—Shlesinger, Fitzsimmons & Shlesinger

[57] ABSTRACT

A plurality of pairs of tubular members are secured at their lower ends in spaced relation on the roof or trunk lid of an automobile by conventional suction cups. One member of each pair has a socket in its upper end for receiving and supporting the goose neck portion of an inverted bicycle frame, and the other member of the pair has a cylindrical projection on its upper end adapted to slide snugly into the bore of the tubular seat post of a bicycle frame after the bicycle seat has been removed. Threaded rods extend between and adjustably separate the two support members of each pair; and the pairs of members are held in laterally spaced relation by a plurality of spacer bars which extend between adjacent pairs of support members. At least one of the spacer bars is a flexible torsion bar which permits at least one support member of a pair to be pivoted about its lower end slightly to adjust the space between the upper ends of the pair so that bike frames of different sizes can be held on the rack.

10 Claims, 6 Drawing Figures

BICYCLE RACK FOR AUTOS

This invention relates to bicycle racks, and more particularly to a novel rack which is attachable to the roof or trunk top of automobiles, and the like.

Numerous automobile-mounted bicycle racks are available, but most of them have certain disadvantages. Some support the bicycles in such a manner that they project too far from the automobile on which they are mounted; and others are mounted so that they interfere with the opening and closing of a vehicle's doors or trunk lid. In the case of certain other racks it is necessary to remove one or two of the wheels of the bike in order to mount it on the rack. This has the disadvantage that the rather cumbersome wheel or wheels must then be stored somewhere else in or on the vehicle. Also, since the bearing mountings for such wheels are usually lubricated, the storing of the wheels apart from the bicycles can be a vexing problem.

It is an object of this invention, therefore, to provide an improved bicycle rack of the type described which enables a plurality of bicycles to be mounted on the vehicle in a very compact and secure manner.

Still another object of this invention is to provide an improved bicycle rack of the type described which is readily mountable on the roof, trunk lid or hatch back of a vehicle, such as an automobile, and can be adjusted to suit variously sized automobiles.

Another object of this invention is to provide an improved bicycle rack of the type described which is very light, yet sturdy, and which can be readily assembled or disassembled for storage when not in use.

A further object of this invention is to provide a bicycle rack of the type described which can be used for supporting a plurality of bikes of different frame sizes.

Another object of this invention is to provide an improved bicycle rack which, as compared to certain prior such bicycle racks, reduces the extent to which bicycles project from the automobile on which they are carried.

Other objects of the invention will be apparent hereinafter from the specification and from the recital of the appended claim, particularly when read in conjunction with the accompanying drawings.

IN THE DRAWINGS

Figure 1:
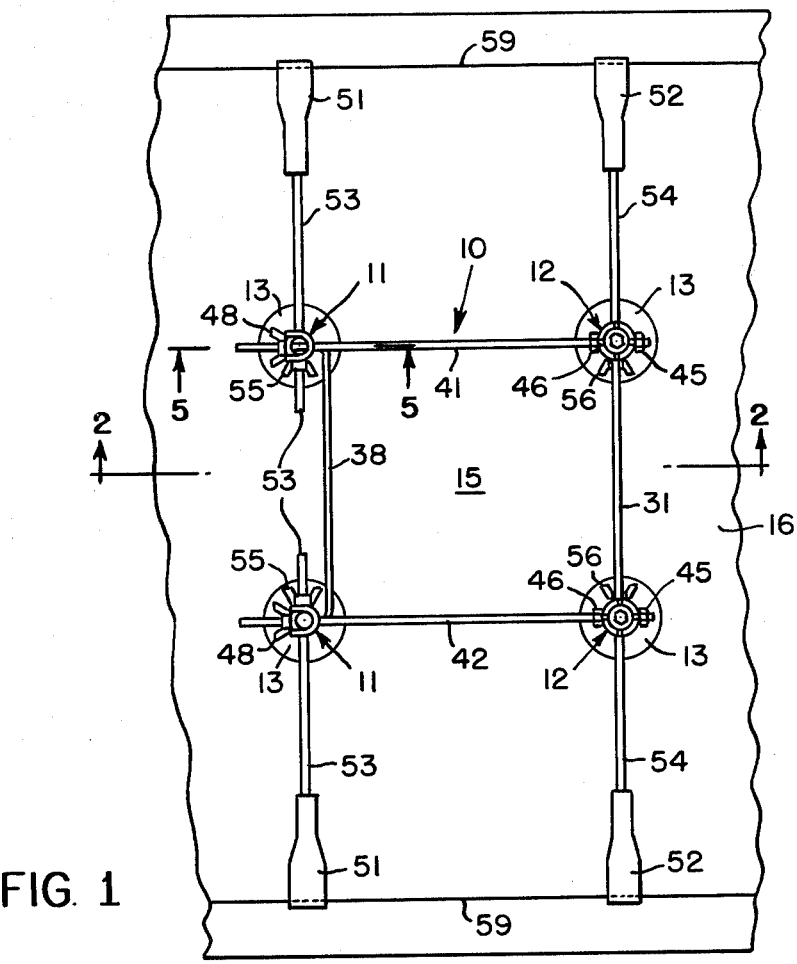
FIG. 1 is a fragmentary plan view of an automobile having mounted on the top thereof a bicycle rack made according to one embodiment of this invention, the rack being the type which is adapted to support thereon two bicycles.

Referring now to the drawings by numerals of reference, and first to FIG. 1, 10 denotes generally an adjustable bicycle rack comprising two pairs of spaced support members, the two members of each pair being denoted generally by the numerals 11 and 12, respectively. As noted hereinafter, each of the support members 11 is adapted to support the goose neck portion of a bicycle, and each member 12 its tubular seat post portion. Each support member 11 and 12 has on its lower end a conventional suction cup 13 by means of which the respective member is adapted to be secured on the roof 15 of an automobile 16, or the like.

Each of the members 12 is tubular in configuration, and comprises a lower, cylindrical end portion 21 (FIGS. 2 and 3), an intermediate, truncated-conical shoulder portion 22, and an upper, cylindrical end portion 23, which is smaller in diameter than the lower end portion 21. The lower end of each member 12 is press fit onto the reduced-diameter, upper end portion 13' (FIG. 3) of its associated suction cup 13.

Figure 4:
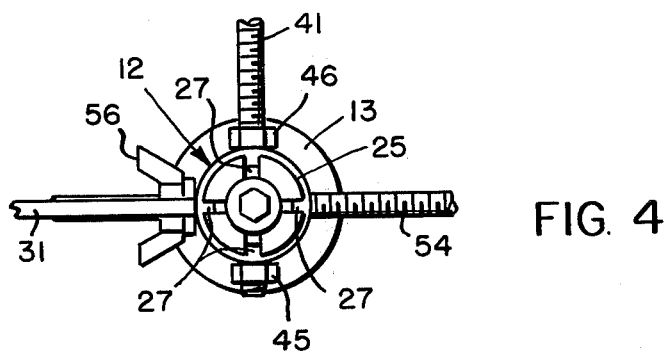
FIG. 4 is a fragmentary plan view of that portion of the rack illustrated in FIG. 3, but on a smaller scale.
Figure 3:
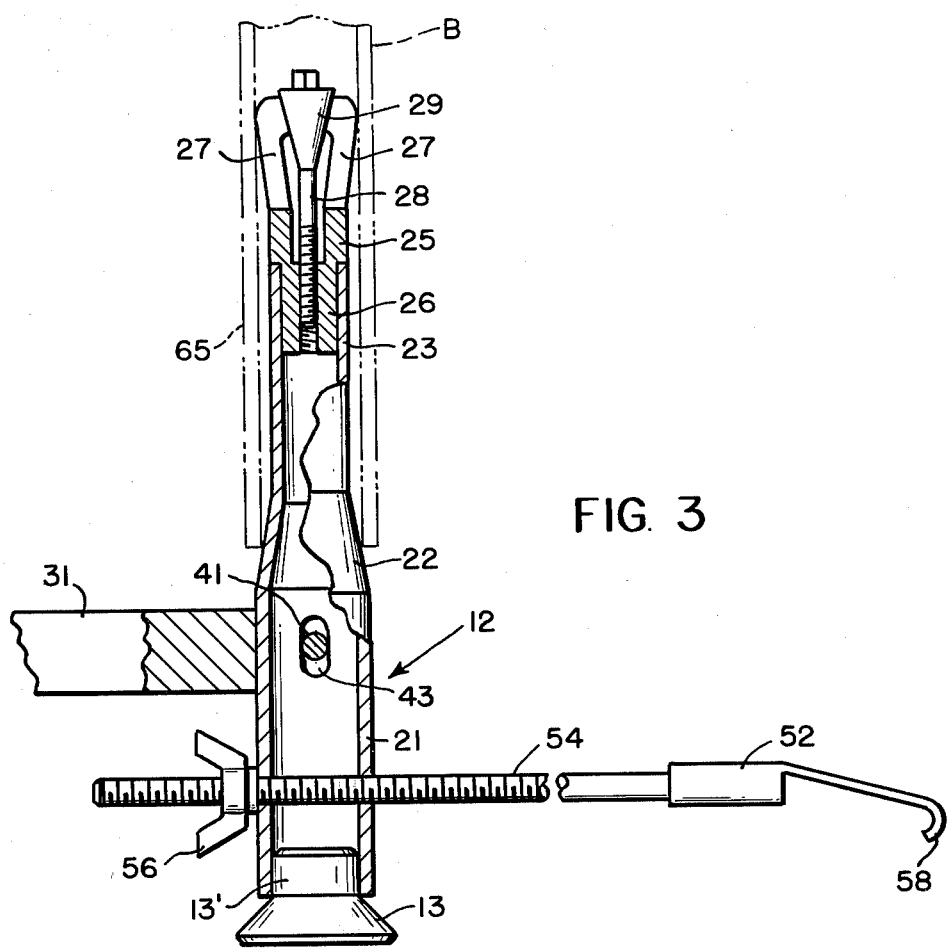
FIG. 3 is a still further enlarged fragmentary sectional view taken along the line 3—3 in FIG. 2 looking in the direction of the arrows, and with a portion of the rack being shown in full.

Secured in the upper end of each member 12 is a nylon expander sleeve 25, having a reduced-diameter shank portion 26 which is secured in the bore of portion 23 of the associated member. At its upper end each sleeve 25 has in its annular wall a plurality of angularly spaced, axially extending slots 27 (FIGS. 3 and 4). Mounted in the bore of sleeve 25 with its externally threaded shank portion threaded into the lower end 26 of the sleeve is an adjustable expansion screw 28, which has an inverted, truncated-conical head portion 29 formed on its upper end. The screw 28 is adjustable manually by a wrench, whereby the tapered surface on its head 29 either spreads the slotted upper end of the sleeve radially outwardly when the screw is threaded downwardly into the sleeve or allows the slotted end of the sleeve to retract radially inwardly when the screw 28 is backed off.

The two tubular support members 12 in the embodiment illustrated are fixed in laterally spaced relation by an elongate torsion bar 31, opposite ends of which are welded or otherwise secured to the outer peripheral surfaces of members 12 just beneath their sloped or truncated-conical shoulder portions 22. Each bar 31 is generally rectangular in cross section, and is capable of being flexed or twisted about its longitudinal axis, so that it is possible for the two supports 12 to be tilted slightly relative to each other as noted hereinafter.

Figure 5:
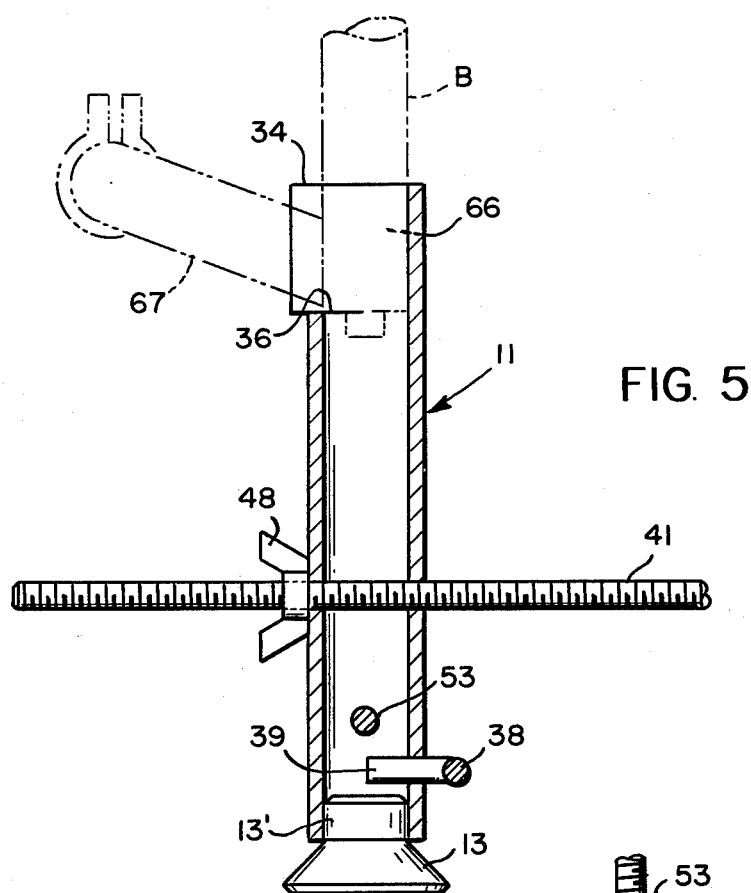
FIG. 5 is an enlarged, fragmentary sectional view taken along the line 5—5 in FIG. 1 looking in the direction of the arrows, and illustrating in phantom by broken lines the portion of the bicycle which is adapted to be supported by this part of the rack.
Figure 6:
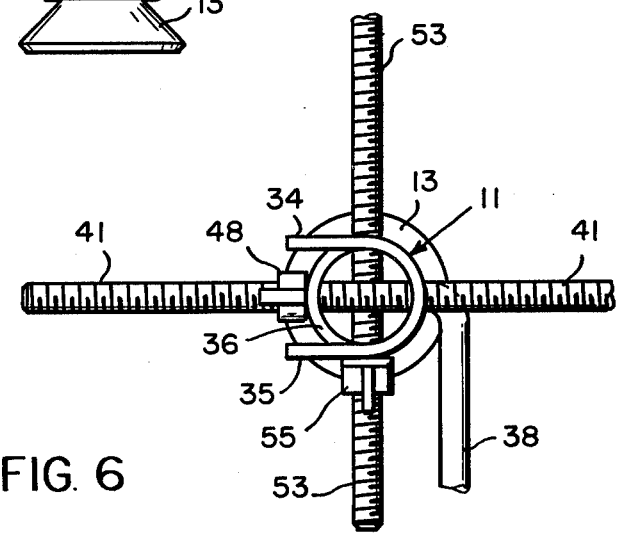
FIG. 6 is a fragmentary plan view of that portion of the bicycle rack shown in FIG. 5.

As shown more clearly in FIGS. 5 and 6, each of the tubular members 11 is generally tubular in configuration and has its lower end press fit over the reduced-diameter end 13' of the associated suction cup 13. Fixed or integral at its closed end with the upper end of each support member 11 is a generally U-shaped bracket having spaced legs 34 and 35 which project generally tangentially beyond the member 11 and in directions away from the associated support member 12. This bracket can be formed as an integral part of a member 11 by having diametrally opposite portions of its annular wall cut away from the main portion of the member and formed as at 34 and 35 to extend parallel to each other. These cut away portions 34 and 35 form on each member 11 adjacent its upper end an arcuate seat or edge 36 on the member for a purpose noted hereinafter.

The two support members 11 are secured in laterally spaced relation by means of an elongate rod 38 (FIGS. 1, 2, 5 and 6), opposite ends of which are bent at right angles to the length of the rod to form thereon hook-shaped end portions 39 (FIG. 5), which are secured in openings formed in the annular wall of each member 11 adjacent its lower end. The torsion bar 31 and rod 38 thus maintain the two pairs of bicycle supports in laterally spaced relation on the roof 15 of the car.

The two supports 11 and 12 of each pair thereof are adjustably connected to each other by a connecting rod 41 or 42, opposite ends of which are externally threaded. The rods 41 and 42 project at one end (the right ends thereof as shown in FIG. 1) through a pair of registering, vertical slots 43, which are formed in diametrically opposite sides of support member 12 beneath its shoulder portion 22. Each rod 41 and 42 projects through its associated support member 12 and has threaded on its outer end (the right in FIG. 1) a lock nut 45, which is engageable with the outer peripheral surface of the associated member 12 to prevent withdrawal of the rod 41 and 42 from the member. Another lock nut 46 is threaded onto the right end of each rod 41 and 42 for engagement with the side of the associated support 12 diametrically opposite the associated lock nut 45. In this manner each pair of lock nuts 45, 46, secures the associated rod 41 or 42 to the associated support 12 for rotation relative to the member, and for limited pivotal movement in planes extending parallel to the vertical slots 43 in the support members 12.

Figure 2:
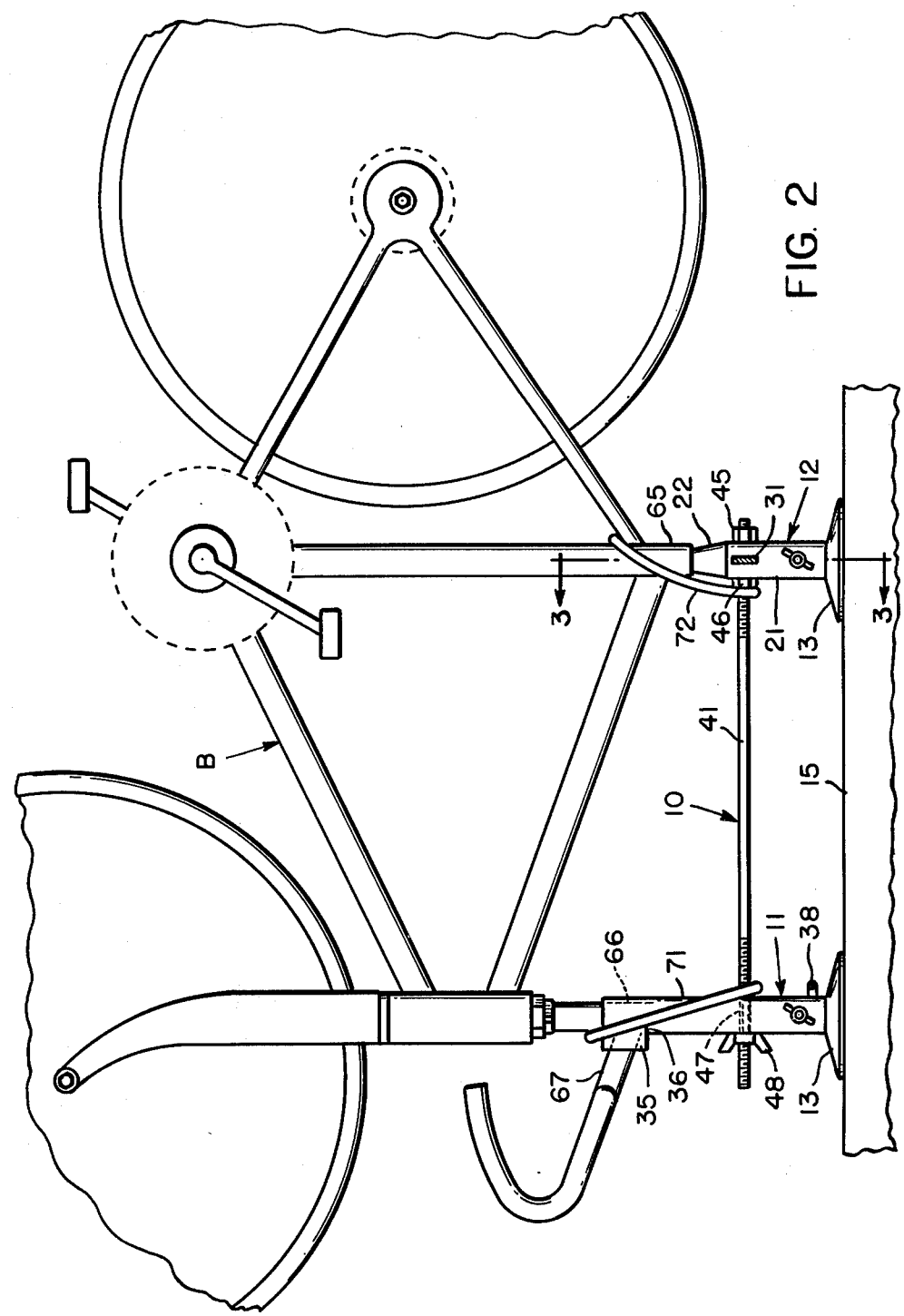
FIG. 2 is a greatly enlarged fragmentary sectional view taken along the line 2—2 in FIG. 1 looking in the direction of the arrows, and showing a typical bicycle as it would appear when supported by the rack on an automobile roof top.

At its opposite end each of the rods 41 and 42 threads, as shown for example at 47 in FIG. 2, through registering, internally-threaded bores that are formed in diametrically opposite sides of each support member 11 intermediate its ends. Each of the rods 41 and 42 extends beyond the associated support member 11 and has threaded thereon an adjustable wing nut 48, which is designed to lock the associated rod 41 or 42 against rotational adjustment relative to its members 11, 12 when the nut 48 is seated against the associated support member 11. Rods 41 and 42 thus permit the spaces between the supports 11 and 12 of each pair to be adjusted as noted hereinafter.

The interconnected supports 11 and 12 are also clamped to the top 15 of the automobile 16 by means of two pairs of clamps 51 and 52 (FIGS. 1 and 3). Each of the clamps 51 is secured at its inner end to one end of a clamping rod 53, the opposite end of which is externally threaded, and extends slidably through registering openings formed in opposite sides of each support member 11 adjacent its lower end. Similar connecting rods 54 are attached at one end to the inner ends of the clamps 52, and have on their opposite ends externally threaded portions which project slidably through registering openings formed in each of the support members 12 adjacent its lower end. At their inner ends the rods 53 and 54 have wing nuts 55 and 56, respectively, threaded thereon for engagement with the respective supports 11 or 12. Each clamp 51 and 52 has on its outer end the usual, curved clamping flange 58 (FIG. 3) which is clampingly engageable in known manner over the drain ridge 59 which usually surrounds the perimeter of the conventional automobile roof.

In use, the two wing nuts 48 are backed off from engagement with the associated supports 11 to allow the adjusting rods 41 and 42 to be rotated, if necessary, to adjust the distance separating each goose neck support 11 from its associated seat post support 12. Assuming, for example, that two 28" frame bicycles are to be carried by the rack, the rods 41 and 42 are rotated in one direction or the other to shift the posts 11 into their desired positions, after which the wing nuts 48 are threaded back into their locking positions against the supports 11. The wing nuts 55 and 56 are also loosened at this time to engage the clamps 51 and 52 properly to be adjusted into the positions in which they engage over the ridge line 59 of the car roof. When the rack has been centered, the suction cups 13 are secured in place against the roof, and the wing nuts 55 and 56 are tightened against the associated supports 11 and 12 to draw the clamps 51 and 52 securly against the ridge 59 at opposite sides of the roof, thereby clamping the rack securly on the car.

The seats of the two bicycles which are to be mounted on the car are then removed from the tubular seat posts of the respective bicycle frames. Each bicycle B (FIG. 2) is then inverted and mounted on one pair of supports 11 and 12 by placing the tubular seat post (65 of FIGS. 2 and 3) of the associated bicycle downwardly over the upper end of the support 12 to the extent permitted by the tapered shoulder 22 on the support. At the same time the goose neck portion (66 in FIGS. 2 and 5) of the bicycle is inserted into the upper end of the associated support member 11, so that the portion 67 thereof (FIG. 2) to which the bicycle handlebars are attached, projects between the parallel leg portions 34 and 35 of the bracket on member 11, and rests upon the shoulder 36 which is formed on each support 11 adjacent its upper end. Each bike is then secured in this position by, for example, a pair of conventional rubber or plastic tie-down straps 71 and 72 (FIG. 2), which are engaged beneath the associated rod 41 or 42, and around the frame portions of the bicycle above the associated supports 11 and 12. The weight of the bicycle helps to secure it against movement on its respective supports 11 and 12, so that the only purpose of the tie-downs 71 and 72 is to prevent accidental vertical movement of the bicycle off of the supports whenever the associated automobile is in motion.

As shown more clearly in FIG. 3, the upper end of each post 12 projects upwardly into the tubular bore in the seat post 65 of the associated bicycle, thereby securly supporting the bicycle against any lateral movement. Moreover, by adjusting the screw 28 the upper end of the sleeve 27 on a respective support 12 can be adjusted to increase or decrease its effective outer diameter, so that depending upon the diameter of the bore in the associated bicycle seat post 65, the upper end of the nylon sleeve 25 can be expanded or retracted, as necessary, so that it will always have snug, frictional engagement with the bore wall of the seat post supported thereon, thus tending also to secure the bicycle against vertical movement on the post. The sloping shoulder portion 22 on each support 12 also tends frictionally to engage in the lower end of the bore in a post 65, at least to a certain extent, and cooperates with the outer peripheral shoulder of the associated nylon sleeve 25 to present at least two, axially spaced points at whih the bore in the bicycle post 65 is supported against lateral movement.

The two, parallel, wing-shaped portions formed on the upper end of each support member 11 embrace opposite sides of the handle bar supporting section 67 to hold the handlebars against undesireable turning movement during motion of the associated automobile. These parallel support portions also support the front end of a bicycle against lateral displacement, or any turning movement that the bicycle might otherwise tend to have about the axis of the rear support 12.

In the foregoing description the use of the novel rack was described in connection with the mounting of two identical bicycles. If, instead, two bicycles of different size are to be mounted on the rack (for example bicycles having 24" and 28" frames, respectively), the rack will still function to carry the two differently sized bicycles merely by adjusting the connecting rods 41 and 42 to handle either the 24" or 28" bicycle, and thereafter mounting one of the bicycles on a pair of supports 11, 12 which are properly spaced for the associated bicycle. The second bicycle can be mounted on the remaining pair of supports 11, 12 by engaging the goose neck portion of the bicycle in the front support 11 in the manner shown in FIG. 2, and then mounting the seat post 65 of the associated bicycle on the rear support 12 by pivoting the latter about its lower end either forwardly or rearwardly, toward or away from the front support 11, while causing the associated torsion bar 31 to be twisted about its axis, if necessary, and at the same time causing the associated connecting rod 41 and 42 to be swung slightly relative to the associated support 12 as permitted by the vertical slots 43 in the support. The bicycles are then secured in position by the above-described tie-downs, so that when the two bikes are mounted on the rack the axes of the two supports 11, will, in essence, remain parallel to each other, while the axes of the two supports 12 will no longer be parallel. Despite this slight strain on the torsion bar 31, it has been found that two such differently sized bicycles can be readily carried on the rack 10 merely by adjusting one of the supports 12 as noted.

From the foregoing it will be apparent that the instant invention provides relatively simple and inexpensive means for carrying bicycles on the roof, trunk lid or hatch back of automobiles, or the like. By removing the bicycle seat from each bicycle that is to be mounted on the rack, and by employing the vertically disposed support members 12, which extend upwardly into the bore in each of the seat posts of the bicycles mounted on the rack, the rear portions of the bikes are firmly and securly held against movement on the rack both as a result of the weight of the bicycle itself, and as a result of the configuration of the support 12. Similarly, each support 11 utilizes both its configuration and the weight of the bicycle to secure the forward end of a bike against any undesireable movement on the rack. One of the major advantages of this novel rack is the simplicity of utilizing tubular members of relatively simple construction for adjustably clamping bicycles on an automobile. The overall rack is not only extremely light (for example in the range of 7 pounds in the case of the illustrated embodiment), but it also can be readily stored when not in use. Although it is necessary to remove the associated bicycle seat from any bike that is to be mounted on the rack, the storage of the seat is a relatively simple matter, as is the process of removing or replacing the seat in the seat post. Usually this can be done merely by loosening or tightening a nut, which locks a post that normally projects from the bottom of the bicycle seat into the bore of the seat post.

Moreover, while the rack has been described in connection with one which is designed for mounting only two bicycles, it will be apparent that additional pairs of supports 11 and 12 could be incorporated in the rack so as to enable it to support additional bicycles without departing from this invention. Also, while the invention has been illustrated and described in detail in connection with only a single embodiment thereof, it will be apparent that still other modifications can be made, and that this application is intended to cover any such modifications as may fall within the scope of one skilled in the art or the appended claims.

Having thus described my invention, what I claim is:

1. An automobile bicycle rack for supporting at least one inverted bicycle with its seat removed from its tubular seat post, comprising a pair of bicycle support members having upper and lower ends, respectively, means for releasably securing the lower ends of said members in spaced relation on an exterior surface of an automotive vehicle with the upper ends of said members projecting outwardly from said surface in spaced relation;

one of said members having in its upper end a socket for receiving and supporting the goose neck portion of an inverted bicycle, and the other of said members having on its upper end a cylindrical projection disposed to extend into the bore in the seat post of said inverted bicycle to assist in supporting the bicycle in an inverted position over said surface, when the goose neck portion of the bicycle is seated in said socket.

2. An automobile bicycle rack as defined in claim 1, wherein said other member has formed thereon between its lower end and said cylindrical projection an external circumferential shoulder engageable with the lower end of the seat post of an inverted bike to limit the extent to which said post slides downwardly over said projection.

3. An automobile bicycle rack as defined in claim 2, wherein said circumferential shoulder is truncated-conical in configuration, and is disposed coaxially of the axis of said cylindrical projection.

4. An automobile bicycle rack as defined in claim 1, including a flexible expander element secured to the upper end of said cylindrical projection and having an outer peripheral surface frictionally engageable with the bore wall of a seat post when the latter is inserted over said cylindrical projection.

5. An automobile bicycle rack as defined in claim 4, wherein said expander element has a cylindrical shank portion secured in a axial bore in said cylindrical projection, and has a tubular portion extending coaxially beyond said projection, an adjusting screw is threaded coaxially into said shank of said element and has thereon a circumferential shoulder engageable with the end of said tubular portion remote from said shank portion, and said tubular portion has therethrough a plurality of axially extending slots angularly spaced about the axis of said element and operative to cause the intervening sections of said annular wall of the element to expand radially outwardly when said screw is adjusted to draw the shoulder thereon axially toward the shank portion of the element.

6. An automobile bicycle rack as defined in claim 1, wherein the upper end of said one member has fixed thereon a gernally U-shaped retainer having the leg portions thereof extending parallel to one another in a horizontal plane, and in directions away from said other member, whereby the goose neck portion of an inverted bicycle is insertable onto the upper end of said one member to extend between the leg portions of said retainer to be secured thereby against lateral movement on said vehicle.

7. An automobile rack for supporting bicycles in inverted positions on an automotive vehicle, and with the seats removed from the tubular seat posts of the bicycle frames, comprising a plurality of pairs of bicycle supports each having a suction cup on its lower end for securing said lower end on the exterior surface of an automotive vehicle, a socket formed on the upper end of one of each of the two supports of a pair thereof, a cylindrical extension formed on the upper end of the other support of each pair thereof, means for securing said pairs of supports in spaced relation on said exterior surface of an automotive vehicle with said upper ends thereof projecting above said surface, and with the socket on said one support of each pair thereof being spaced from the cylindrical extension on the corresponding other support of said pair a distance approximately equal to the distance between the goose neck and seat post portions, respectively, of each bicycle frame that is to be supported on the rack, and means for releasably holding a bicycle in an inverted position on one of said pair of supports with the goose neck portion of the bike seated in the socket on said one support of the pair, and with the said cylindrical extension on said other support of the pair extending into the bore in the seat post of the bike frame.

8. An automobile bicycle rack as defined in claim 7, wherein said securing means comprises a first plurality of elongate, parallel members secured to and extending between said pairs of supports to maintain said pairs of supports in spaced relation to each other, and a second plurality of elongate, parallel members secured to and extending between the two supports of each pair thereof, and transversely of said first plurality of members and operative to maintain the space between the two supports of a pair approximately equal to said distance between the goose neck and seat post portions of a bike, one of said pluralities of members being adjustable relative to the associated supports thereby to adjust the space maintained by said one plurality of members between the last-named supports.

9. An automobile bicycle rack as defined in claim 8, wherein said one plurality of members comprises a plurality of metal rods each of which is secured at one end to one support of each pair thereof for rotation relative to said one support and is adjustably secured at its opposite end to the other support of each pair thereof, whereby upon rotation of one of said rods said other support of a pair will be shifted toward or away from said one support of the pair thereby to adjust the distance between said pair of supports.

10. An automobile bicycle rack as defined in claim 9, wherein said members include a torsion bar extending between and interconnecting said one supports of said pairs, and said one ends of said rods are secured to said one supports of said pairs for limited pivotal movement relative to said one support to which it is secured, whereby each of said one supports is pivotal slightly relative to the axis of said torsion bar to allow slight adjustments in the distance separating the upper end of said one support of a pair from the upper end of the other support of the pair.

* * * * *